D. WARNER.
VEHICLE SEAT.
APPLICATION FILED JAN. 28, 1914. RENEWED JULY 2, 1915.
1,150,982.
Patented Aug. 24, 1915.
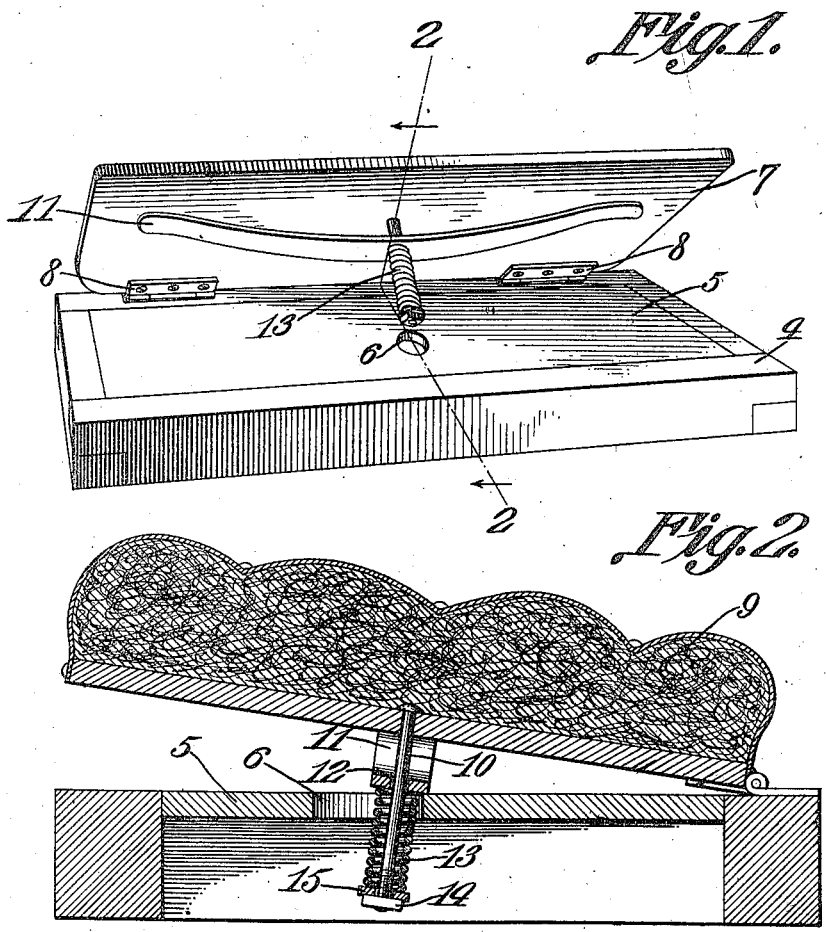

UNITED STATES PATENT OFFICE.

DANIEL WARNER, OF BRONSON, MICHIGAN, ASSIGNOR OF ONE-HALF TO ENOS EUTZLER, OF MISHAWAKA, INDIANA.

VEHICLE-SEAT.

1,150,982. Specification of Letters Patent. Patented Aug. 24, 1915.

Application filed January 28, 1914, Serial No. 815,038. Renewed July 2, 1915. Serial No. 37,782.

*To all whom it may concern:*

Be it known that I, DANIEL WARNER, a citizen of the United States, residing at Bronson, in the county of Branch and State of Michigan, have invented a new and useful Vehicle-Seat, of which the following is a specification.

This invention relates to improvements in spring seats and more particularly to a spring seat especially adapted for use in automobiles.

An object of the present invention is to provide a spring seat which will successfully take up the jars and shocks incident to the passing of the automobile or vehicle over rough roads.

A further object is to provide in connection with a spring seat which is hingedly secured at its rear edge to a supporting structure novel means for yieldably supporting the seat.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention has been shown.

In said drawings:—Figure 1 is a view in perspective of the improved device and illustrating the same with the seat plate in a slightly raised position to more clearly illustrate the structural details of the device. Fig. 2 is an enlarged sectional view taken on the line 2—2 of Fig. 1.

Referring to the drawings in which similar reference numerals designate corresponding parts throughout the several views, a frame or support 4, which includes a board or panel 5 having a central opening or aperture 6, has a seat plate 7 hinged thereto. To this end the rear edge of the seat plate 7 is connected by means of hinges 8 to the rear portion of the frame 4. The normal position of the oscillatory seat plate 7 which carries the cushion 9 is a forwardly inclined one as illustrated in Fig. 2.

Rigidly secured to and depending from the seat plate 7 is a rod or stem 10 which is so positioned that it will pass through the aperture 6 of the board 5. A bowed leaf spring 11 has an aperture 12 intermediate its ends, and the rod 10 engages slidably through the said aperture. The spring 11 is approximately parallel to the longitudinal axis of the hinges 8, and the intermediate portion of the spring 11 which slidably engages the rod 10 normally seats upon the board 5, while the ends of the spring bear against the seat plate. The spring 11 takes up and modifies jars and shocks, and in order to prevent undue rebound of the seat, a coiled spring 13 is positioned upon the rod 10, between the leaf spring 11 and the nut and washer 14 and 15 engaged upon the free end of the rod 10 and by which means the compression of the spring 13 may be adjusted so as to properly counteract the reflex action of the leaf spring.

The leaf spring is yieldably held against the bottom of the seat plate 7 by the expansion spring 13 and seats upon the board 5, while the spring 13 projects through the aperture 6 as clearly illustrated in Fig. 2. Thus the seat will be yieldably supported in a comfortable manner.

The many advantages accruing from the present device will be apparent and among which may be mentioned the desirable feature that the hinges 8 constrain the seat plate to vibrate conveniently, without a sidewise motion.

Having thus described the invention, what I claim is:—

A seat structure embodying a frame, a seat hinged thereon, a rod secured to and depending from the seat, the frame having an opening for the passage of the said rod, a bowed spring having its intermediate portion slidably engaging the rod to seat upon the frame, and having its ends bearing against the seat, and an expansion coiled wire spring mounted upon the rod between the bowed spring and the free end of the rod.

In testimony that I claim the foregoing as my own, I have hereto affixed my signature in the presence of two witnesses.

DANIEL WARNER.

Witnesses:
A. LE ROY LOCKE,
LOTTIE E. FERRAUD.